(12) United States Patent
Goswami et al.

(10) Patent No.: US 11,480,161 B1
(45) Date of Patent: Oct. 25, 2022

(54) CONCENTRATED SOLAR SYSTEMS COMPRISING MULTIPLE SOLAR RECEIVERS AT DIFFERENT ELEVATIONS

(71) Applicant: University of South Florida, Tampa, FL (US)

(72) Inventors: D. Yogi Goswami, Tampa, FL (US); Diego Guillen, Tampa, FL (US); Marco Sanjuan, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/229,598

(22) Filed: Apr. 13, 2021

Related U.S. Application Data

(60) Provisional application No. 63/008,875, filed on Apr. 13, 2020.

(51) Int. Cl.
| | |
|---|---|
| *F03G 6/02* | (2006.01) |
| *F24S 20/20* | (2018.01) |
| *F24S 70/65* | (2018.01) |
| *F24S 50/40* | (2018.01) |
| *F24S 60/00* | (2018.01) |
| *F03G 6/06* | (2006.01) |
| *F24S 10/20* | (2018.01) |

(52) U.S. Cl.
CPC .............. *F03G 6/02* (2013.01); *F03G 6/06* (2013.01); *F24S 10/20* (2018.05); *F24S 20/20* (2018.05); *F24S 50/40* (2018.05); *F24S 60/00* (2018.05); *F24S 70/65* (2018.05); *F03G 6/063* (2021.08)

(58) Field of Classification Search
CPC .... F03G 6/02; F03G 6/06; F03G 6/063; F24S 10/20; F24S 20/20; F24S 50/40; F24S 60/00; F24S 70/65
USPC ........................................... 60/641.8–641.15
See application file for complete search history.

(56) References Cited

U.S. PATENT DOCUMENTS

| | | | | |
|---|---|---|---|---|
| 4,265,223 | A | 5/1981 | Miserlis et al. | |
| 4,454,865 | A * | 6/1984 | Tammen | F24S 20/20 126/640 |
| 9,080,788 | B2 | 7/2015 | Simiano | |
| 2009/0179429 | A1* | 7/2009 | Ellis | F01K 17/005 290/1 R |
| 2010/0295306 | A1* | 11/2010 | Ridnik | F03G 6/005 290/52 |
| 2012/0240577 | A1* | 9/2012 | Mandelberg | F24S 10/30 60/641.15 |
| 2013/0091842 | A1* | 4/2013 | Kaufmann | F03G 6/003 60/641.8 |

(Continued)

OTHER PUBLICATIONS

Kiwan et al., Optical Performance of a Novel Two-Receiver Solar Central Tower System, Journal of Solar Energy Engineering, 2020, 142:011005-1 thru 011005-13.

(Continued)

*Primary Examiner* — Hoang M Nguyen
(74) *Attorney, Agent, or Firm* — Quarles & Brady LLP

(57) ABSTRACT

In one embodiment, a concentrated solar power system includes a solar tower, multiple solar receivers mounted to the solar tower at different vertical elevations, and a plurality of heliostats provided on the ground within a heliostat field, wherein each heliostat is configured to concentrate solar radiation on any of the solar receivers mounted to the solar tower.

22 Claims, 3 Drawing Sheets

(56) References Cited

U.S. PATENT DOCUMENTS

| | | | | |
|---|---|---|---|---|
| 2013/0292084 A1* | 11/2013 | Luz | ............... | F24S 20/20 |
| | | | | 165/10 |
| 2013/0307273 A1* | 11/2013 | Afremov | ............... | F03G 6/02 |
| | | | | 290/52 |
| 2016/0032903 A1* | 2/2016 | Reynolds | ............... | F22B 1/006 |
| | | | | 60/641.15 |

OTHER PUBLICATIONS

Pang et al., Two-Stage Solar Power Tower Cavity-Receiver Design and Thermal Performance Analysis, AIP Conference Proceedings 1850, 2017, pp. 030037-1 thru 030037-9.

Schmitz et al., Assessment of the Potential Improvement Due to Multiple Apertures in Central Receiver Systems with Secondary Concentrators, Solar Energy, 2006, 80:111-120.

* cited by examiner

CONCENTRATED SOLAR SYSTEMS COMPRISING MULTIPLE SOLAR RECEIVERS AT DIFFERENT ELEVATIONS

CROSS-REFERENCE TO RELATED APPLICATION

This application claims priority to U.S. Provisional Application Ser. No. 63/008,875, filed Apr. 13, 2019, which is hereby incorporated by reference herein in its entirety.

BACKGROUND

Energy independence and supply is a worldwide concern. Therefore, devolvement of more efficient and cost-effective power generation technologies are primary goals of many research efforts. In this regard, concentrated solar power can be used with thermal energy storage or fuel hybridization, which enables solar power systems to provide energy over periods of low or intermittent solar radiation, including night time.

Among concentrated solar power plants, central solar receiver systems are a desirable option for high-temperature applications because they are more efficient than other options that are currently available. This technology uses a large field of heliostats that track the sun and concentrate solar radiation on a solar receiver mounted to the top of a tower. The energy absorbed by the receiver is used to a heat transfer fluid, which is then delivered to a power cycle or an intermediate energy storage system.

While concentrated solar power plants are viable and relatively efficient, they could be more efficient in terms of both solar radiation and ground space utilization. Regarding solar radiation utilization, if the solar receiver is mounted at a relatively low vertical elevation, the heliostats at the outer edge of the heliostat field far from the receiver may not be able to concentrate all of the light received from the sun. Conversely, if the receiver is mounted at a relatively high vertical elevation, the heliostats nearest the tower may not be able to concentrate all of the light received from the sun. This results in less solar radiation being concentrated on the receiver and, therefore, reduced capacity for heating the heat transfer fluid. Regarding ground space utilization, because of the limitations associated with placing the heliostats too close or too far from the receiver, much of the available ground space is not utilized and, therefore, less solar radiation being concentrated on the receiver.

In view of the above facts, it can be appreciated that it would be desirable to have concentrated solar power systems and methods that better utilize the available solar radiation and ground space.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have concentrated solar power systems and methods that better utilize solar radiation and ground space. Disclosed herein are concentrated solar power systems and methods in which multiple solar receivers are mounted at different vertical elevations on a single solar tower instead of a single solar receiver being mounted at a single vertical elevation. Such a system configuration enables heliostats of the system to be individually controlled to concentrate solar radiation on any one of the solar receivers mounted to the solar tower depending, for example, upon the nature of solar radiation that is being received at the time. In some embodiments, the solar receivers use the same heat transfer fluid. In other embodiments, however, the solar receivers are independent of each other and, therefore, do not share the same heat transfer fluid. In such embodiments, the solar receivers can use different types of heat transfer fluids that may be suitable for use in different types of thermodynamic cycles. This flexibility can be used to optimize the performance of the concentrated solar power system beyond that of conventional systems.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Figure 1:
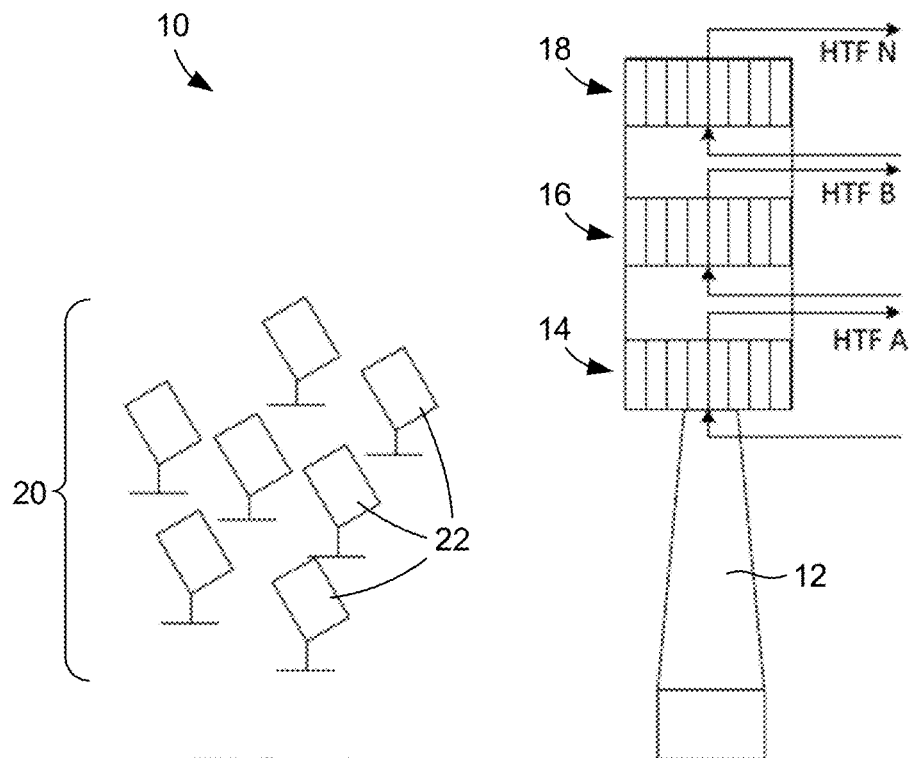
FIG. 1 is a schematic diagram that illustrates an example embodiment of concentrated solar power system comprising multiple vertically spaced solar receivers mounted to the same solar tower.

As identified above, disclosed herein are concentrated solar power systems and methods that utilize multiple solar receivers mounted at different vertical elevations of a solar tower to increase the efficiency of the system. FIG. 1 illustrates an example of such a concentrated solar power system 10. The system comprises a single solar tower 12 to which are mounted multiple solar receivers, including a first solar receiver 14, a second solar receiver 16, and a third solar receiver 18. While three solar receivers 14-18 are illustrated in FIG. 1, it is noted that any number of receivers can be mounted to the tower 12, as desired. In accordance with the present invention, however, two or more receivers are mounted to a single tower. With further reference to FIG. 1, each solar receiver 14, 16, and 18 is located at a different vertical elevation so that the receivers are vertically spaced from each other. In the example of FIG. 1, the first receiver 14 is located at a first, lowest vertical elevation, the second receiver 16 is located at a second, intermediate vertical elevation that is higher than the lowest vertical elevation, and the third receiver 18 is located at a third, highest vertical elevation that is higher than the intermediate vertical elevation.

The concentrated solar power system 10 of FIG. 1 further comprises a heliostat field 20 that includes a plurality of heliostats 22 that are positioned at spaced locations within the field. As is known, a heliostat is a device that includes a mirror that can be tilted in both the vertical and horizontal directions to enable the heliostat to concentrate incident solar radiation on a solar collector. While a particular number of heliostats 22 is shown in FIG. 1, it is to be understood that those heliostats are merely intended to depict a plurality of heliostats. In some embodiments, the heliostat field 20 can include hundreds or thousands of heliostats 22.

As noted above, each of the solar receivers, such as receivers 14-18 of the concentrated solar power system 10, can share the same heat transfer fluid. That is, the same heat transfer fluid that flows through one receiver, such as receiver 14, can then flow through the next (e.g., higher elevation and higher temperature) receiver, such as receiver 16, and so forth. In other embodiments, such as that illustrated in FIG. 1, each receiver 14-18 uses a different heat transfer fluid. This means not only that the various receivers 14-18 do not share the same fluid but further can use different types of heat transfer fluids that may be suitable for different temperature applications, such as different thermodynamic cycles (e.g., power cycles). It is noted that, as used herein, the term "thermodynamic cycle" describes not only the concept of a thermodynamic cycle, which comprises a linked sequence of thermodynamic processes that involve transfer of heat and work into and out of the system while varying pressure, temperature, and other variables within the system, but also thermodynamic systems that physically embody and operate in accordance with the associated conceptual thermodynamic cycle.

With continued reference to FIG. 1, it is noted that the solar receivers 14-18 can be "cascaded" such that they form parts of different stages of the same process. Examples of concentrated solar power systems having cascaded solar receivers are described below in relation to FIGS. 2-5.

It is noted that a concentrated solar power system such as that shown in FIG. 1 comprises various unique features that can be used to optimize system performance and efficiency, as well as to provide increased operational flexibility. First, having multiple solar receivers located at different vertical elevations enables heliostats within the heliostat field to be focused on different receivers depending upon the heliostats' distance from the solar tower. For example, the heliostats that are closest to the tower can be controlled (adjusted) to concentrate solar radiation on the lowest receiver while the heliostats that are farthest from the tower can be controlled to concentrate solar radiation on a higher or highest receiver, thereby providing each receiver a better "view" of the heliostat field. If the concentrated solar power system comprises one or more "intermediate" receivers that are positioned between a lowest and highest receiver of the tower, the heliostats positioned between the closest and farthest heliostats within the field can be controlled to concentrate solar radiation on the intermediate receiver(s). This functionality enables better utilization of the incident solar radiation as well as the ground space of the heliostat field.

The provision of multiple, vertically spaced solar receivers also means that each receiver can be configured to operate at a different temperature. For example, the lowest receiver can be configured to operate at the lowest temperature of all the receivers and the highest receiver can be configured to operate at the highest temperature of all the receivers. If there are one or more intermediate receivers, they can be configured to operate at temperatures between the lowest and highest temperatures. In some embodiments, the heat transfer fluid heated by a lower temperature receiver can be used to preheat the heat transfer fluid that is supplied to a higher temperature (e.g., higher elevation) receiver. This enables higher temperatures to be achieved and reduces thermal losses Not only can different solar receivers be operated at different temperatures, they further can operate independently using different heat transfer fluids. As noted above, this means that the receivers can not only not share the same fluid, but can further use different types of heat transfer fluids. In such a case, the different heat transfer fluids can have different states of matter (i.e., liquid or gas) during operation of the concentrated solar power system. For example, the lowest temperature receiver can be configured to use a liquid heat transfer fluid and the highest temperature solar receiver can use a gas heat transfer fluid. This functionality may enable the system to supply heat to different types of thermodynamic systems. Example thermodynamic cycles that embody such systems can include Brayton, Rankine, and combined cycles that use supercritical or organic working fluids.

Furthermore, when a concentrated solar power system includes multiple vertically spaced solar receivers, each individual heliostat can be controlled to concentrate solar radiation on any one of the receivers. Accordingly, the receiver upon which any individual heliostat concentrates solar radiation can be changed whenever desired, whether it be quarterly, monthly, daily, or even at different times of the day. For example, if a concentrated solar power system includes two vertically spaced solar receivers mounted to a solar tower, relatively close heliostats can be focused on the lower receiver and the relatively far heliostats can be focused on the higher receiver for most of the day. However, late in the afternoon when the intensity of the solar radiation is low, each of the heliostats can be focused on one of the receivers to ensure enough heat is collected to operate a given thermodynamic system. Accordingly, the vertical spacing of multiple receivers improves the system operational flexibility during off-design conditions.

As noted above, a concentrated solar power system can comprise multiple vertically spaced, cascaded solar receivers. Cascaded solar receivers either share the same heat transfer fluid or use different heat transfer fluids. FIGS. 2-5 illustrate multiple example concentrated solar power systems using cascaded solar receivers.

Figure 2:
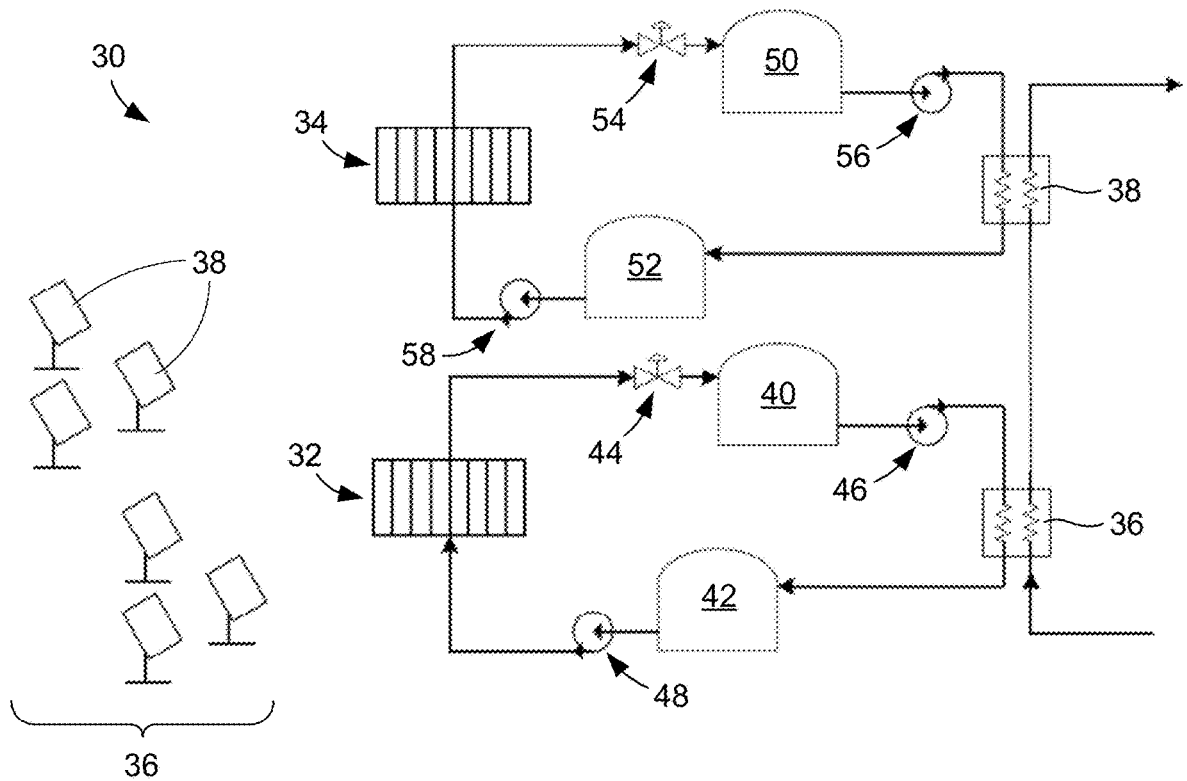
FIG. 2 is a schematic diagram that illustrates a first embodiment of a concentrated solar power system comprising multiple cascaded solar receivers.

FIG. 2 illustrates a first example concentrated solar power system 30 that has multiple vertically spaced, cascaded solar receivers. Like the system 10, the system 30 comprises a single solar tower (not shown) to which are mounted multiple solar receivers, including a first solar receiver 32 located at a first, lower vertical elevation and a second solar receiver 34 located at a second, higher vertical elevation. The system 30 further comprises a heliostat field 36 that includes a plurality of heliostats 38 that are positioned at spaced locations within the field and that are individually controllable in the vertical and horizontal directions so as to be able to concentrate incident solar radiation on either of the receivers 32, 34. In some embodiments, the near-field heliostats (i.e., the heliostats 38 positioned closest to the solar tower) are focused on the first solar receiver 32 and the far-field heliostats (i.e., the heliostats positioned farthest from the tower) are focused on the second solar receiver 34.

With further reference to FIG. 2, the solar receivers 32, 34 are independent of each other and use different heat transfer fluids. In this embodiment, the first solar receiver 32 is a lower temperature receiver and heats a first heat transfer fluid, such as a liquid (e.g., molten salt), to a first temperature (e.g., 550° C.). That thermal energy is then transferred to a common working fluid using a first heat exchanger 36.

The temperature of the common working fluid is raised after passing through the first heat exchanger 36 and the working fluid is then delivered to a second heat exchanger 38 at which its temperature is raised further. As is further shown in FIG. 2, the system 30 also includes a first thermal energy storage system (hot tank) 40 in which heat transfer fluid that exits the first solar receiver 32 can be stored before being delivered to the first heat exchanger 36, and a second thermal energy storage system (cold tank) 42 in which heat transfer fluid that exits the first heat exchanger can be stored before being returned to the first solar receiver. A first valve 44 is provided between the first solar receiver 32 and the first thermal energy storage system 40, a first pump 46 is provided between the first thermal energy storage system and the first heat exchanger 36, and a second pump 48 is provided between the second thermal energy storage system 42 and the first solar receiver 32. These components can be used to control the flow of the heat transfer fluid through the part of the system 30 associated with the first solar receiver 32.

The second solar receiver 34 heats a second heat transfer fluid, such as a gas (e.g., supercritical carbon dioxide ($CO_2$)), to a second, higher temperature (e.g., 750° C.). The second heat transfer fluid can then be provided to the second heat exchanger 38 to raise the temperature of the common working fluid, which was already heated to a first degree in the first heat exchanger 36. The second heat transfer fluid can be stored in a third thermal energy storage system (hot tank) 50 positioned between the second solar receiver 34 and in a fourth thermal energy storage system (cold tank) 52 positioned between the second heat exchanger 38 and the second solar receiver 34. The portion of the system 30 associated with the second solar receiver 34 also includes a second valve 54, a third pump 56, and a fourth pump 58.

Once the common working fluid exits the second heat exchanger 38, it can be applied to some end use, such as electrical power generation. For example, the thermal energy of the common working fluid can drive a turbine of a concentrated solar power plant.

Figure 3:
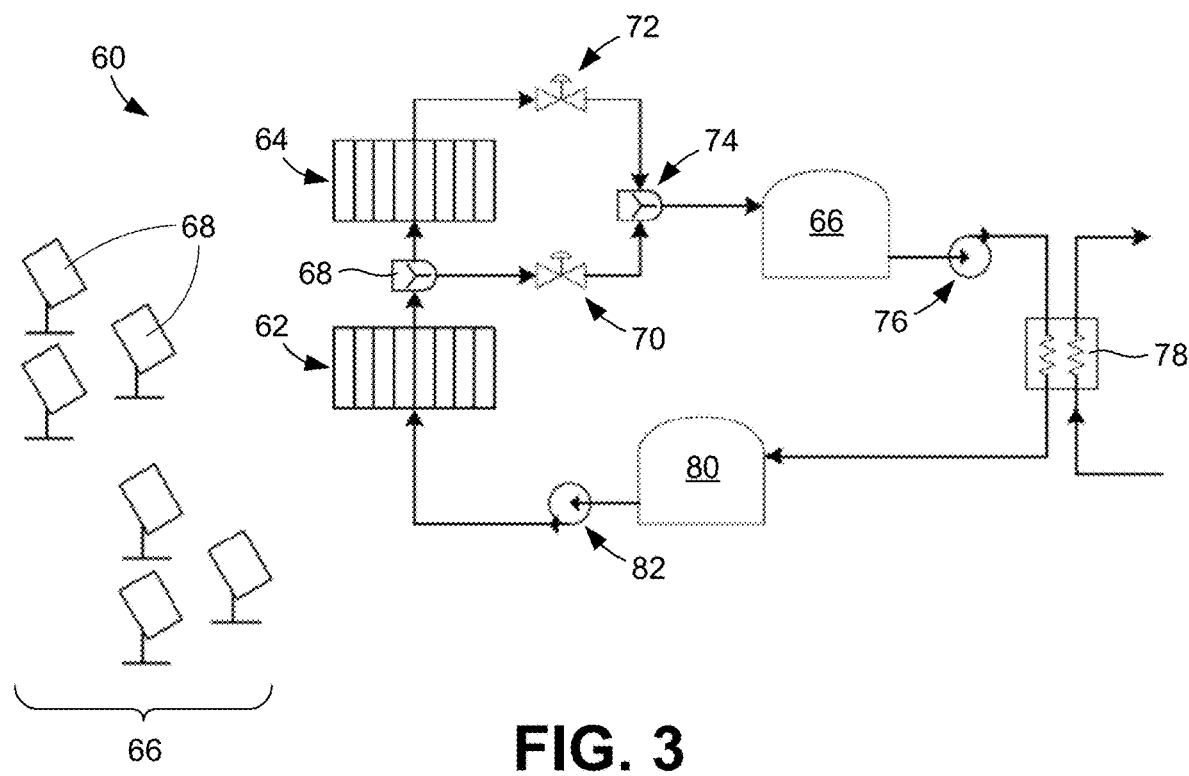
FIG. 3 is a schematic diagram that illustrates a second embodiment of a concentrated solar power system comprising multiple cascaded solar receivers.

FIG. 3 illustrates a second example concentrated solar power system 60 that has multiple vertically spaced, cascaded solar receivers. The system 60 includes a first solar receiver 62 located at a first, lower vertical elevation that operates at a first, lower temperature, and a second solar receiver 64 located at a second, higher vertical elevation that operates at a second, higher temperature. The system 60 further comprises a heliostat field 66 that includes a plurality of heliostats 68. In some embodiments, the near-field heliostats are focused on the first solar receiver 62 and the far-field heliostats are focused on the second solar receiver 64.

In this embodiment, the solar receivers 62, 64 share the same heat transfer fluid. When the system 60 is operated, the first solar receiver 62 heats the heat transfer fluid to a first temperature and the fluid is then delivered to the second solar receiver 64 or to a first thermal energy storage system (hot tank) 66. When the second solar receiver 64 receives the heat transfer fluid, it the fluid heated to a second, higher temperature before it is delivered to the first thermal energy storage system 66. The flow of the heat transfer fluid that exits the first solar receiver 62 is controlled using a fluid splitter 68 and a valve 70, and the flow of heat transfer fluid the exits the second solar receiver 64 is controlled using a valve 72 and a fluid combiner 74, which also receives the heat transfer fluid from the first solar receiver. With such a configuration, the system 60 can be operated with only the first solar receiver 62 providing heated heat transfer fluid (i.e., second solar receiver shut off), only the second solar receiver 64 providing heated heat transfer fluid (i.e., first solar receiver shut off), or both solar receivers simultaneously providing heated heat transfer fluid, which is combined by the fluid combiner 74. Such flexibility enables one of the solar receivers 62, 64 to be shut off when solar irradiation is low, such as during morning and evening hours, as well as during cloudy days.

Heat transfer fluid contained in the first thermal energy storage system 66 can be driven by a pump 76 to a heat exchanger 78 in which heat contained within the heat transfer fluid is transferred to a working fluid that also flows through the heat exchanger. After the heat transfer fluid exits the heat exchanger 78, it is delivered to a second thermal energy storage system (cold tank) 80. The heat transfer fluid can be returned to the first solar receiver 62 using a second pump 82.

Figure 4:
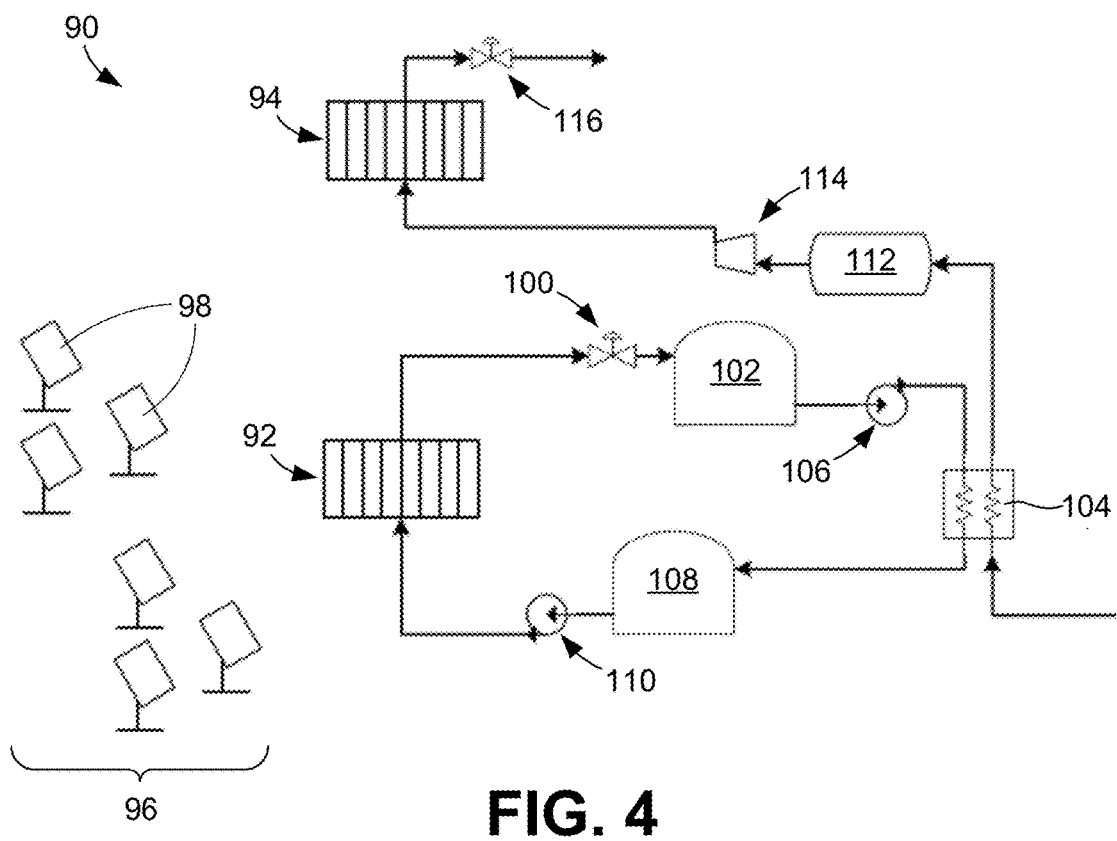
FIG. 4 is a schematic diagram that illustrates a third embodiment of a concentrated solar power system comprising multiple cascaded solar receivers.

FIG. 4 illustrates a third example concentrated solar power system 90 having cascaded solar receivers. The system 90 includes first solar receiver 92 located at a first, lower vertical elevation that operates at a first, lower temperature, and a second solar receiver 94 located at a second, higher vertical elevation that operates at a second, higher temperature. The system 90 further comprises a heliostat field 96 that includes a plurality of heliostats 98. In some embodiments, the near-field heliostats are focused on the first solar receiver 92 and the far-field heliostats are focused on the second solar receiver 94.

In this embodiment, the solar receivers 92, 94 use different heat transfer fluids. When the system 90 is operated, the first solar receiver 92 heats a first heat transfer fluid to a first temperature and the fluid then flows through a first valve 100 to a first thermal energy storage system (hot tank) 102. From there, the heat transfer fluid can be delivered to a heat exchanger 104 using a first pump 106. Within the heat exchanger 104, heat is transferred from the heat transfer fluid to a working fluid that also passes through the heat exchanger. The heat transfer fluid can then be delivered to a second thermal energy storage system (cold tank) 108. Finally, the heat transfer fluid can be returned to the first solar receiver 92 using a second pump 110.

Figure 5:
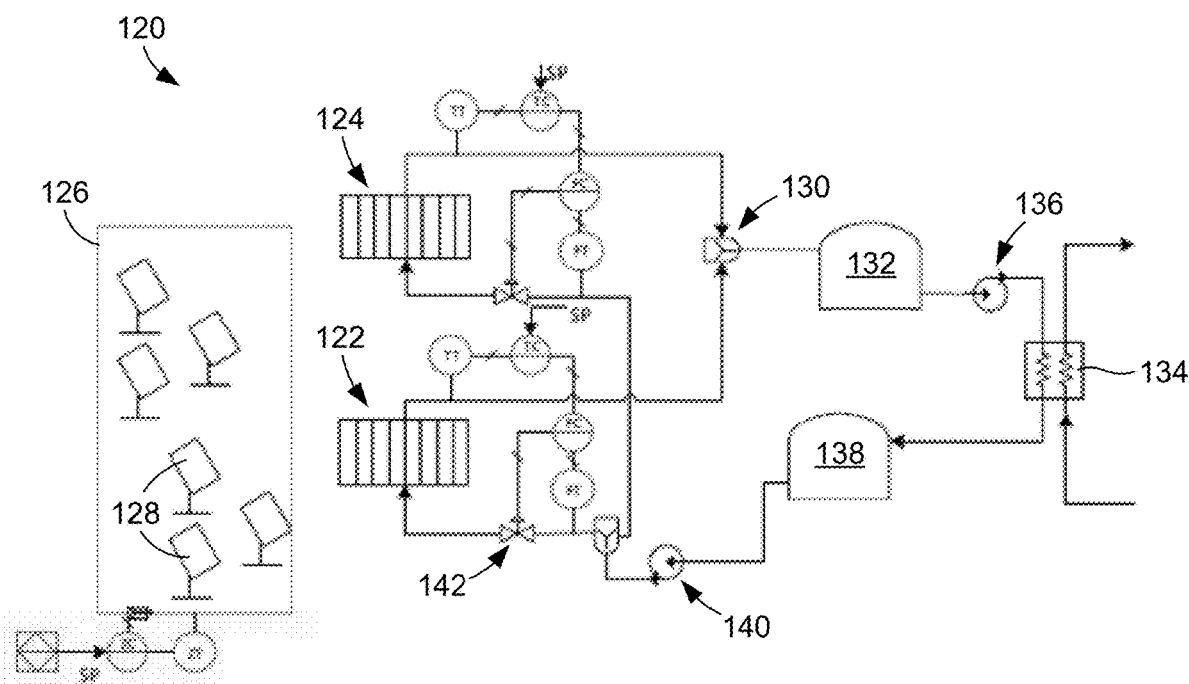
FIG. 5 is a schematic diagram that illustrates a fourth embodiment of a concentrated solar power system comprising multiple cascaded solar receivers.

The working fluid that exits the heat exchanger 104 is delivered to an intermediate vessel 112 that stores the gas-phase heat transfer fluid so that the mass flow rate of the fluid can be controlled relative to the monitored operational condition of the system 90 (see discussion of FIG. 5 for a description of an example monitoring/control system). Downstream of the vessel 112 is a condenser 114 that generates a pressure difference required to remove the gas-phase heat transfer fluid from the vessel. The heated working fluid output from the condenser 114 is then used as the second heat transfer fluid of the system 90, which is heated by the second solar receiver 94 to a second, higher temperature. In some embodiments, the first and second heat transfer fluids can be in different states. For example, the first heat transfer fluid used by the first solar receiver 92 can be a liquid (e.g., molten salt) and the second heat transfer fluid (working fluid) used by the second solar receiver 94 can be a gas (e.g., supercritical $CO_2$).

FIG. 5 illustrates a fourth example concentrated solar power system 120, which includes first solar receiver 122 located at a first, lower vertical elevation that operates at a first, lower temperature, and a second solar receiver 124 located at a second, higher vertical elevation that operates at a second, higher temperature. The system 120 further comprises a heliostat field 126 that includes a plurality of heliostats 128. In some embodiments, the near-field heliostats are focused on the first solar receiver 122 and the far-field heliostats are focused on the second solar receiver 124.

In this embodiment, the solar receivers 122, 124 use the same heat transfer fluid. When the system 120 is operated, the first solar receiver 122 and the second solar receiver 124 heat their respective streams of heat transfer fluid, which are then combined by a first fluid combiner 130. The first fluid combiner 130 delivers the combined stream to a first thermal energy storage system (hot tank) 132. As with the system 60, the system 120 can be operated with only the first solar receiver 122 providing heated heat transfer fluid (i.e., second solar receiver shut off), only the second solar receiver 124 providing heated heat transfer fluid (i.e., first solar receiver shut off), or both solar receivers simultaneously providing heated heat transfer fluid, which is combined by the fluid combiner 130.

The heat transfer fluid can be delivered from the first thermal energy storage system 132 to a heat exchanger 134 using a first pump 136. Within the heat exchanger 134, heat is transferred from the heat transfer fluid to a working fluid that also passes through the heat exchanger. The heat transfer fluid can then be delivered to a second thermal energy storage system (cold tank) 138. After leaving the second thermal energy storage system 134, the heat transfer fluid can be pumped by a second pump 140 to a second fluid splitter 142 that provides a first portion of the flow back to the first solar receiver 122 and a second portion of the flow to the second solar receiver 124. The portion of the heat transfer fluid that is provided to the second solar receiver 124 is heated to a high temperature before it to is delivered to the first thermal energy storage system 132 and then on to the heat exchanger 134.

As is further shown in FIG. 5, the concentrated solar power system 120 also includes first and second control systems for the portions of the system associated with the first and second solar receivers 122, 124, respectively. Each control system comprises a temperature sensor (TT) that is used to monitor the temperature of the heat transfer fluid exiting the associated solar receiver. When the exit temperature of the heat transfer fluid changes, a temperature controller (TC) provides a new setpoint to a mass flow controller (FC), which manipulates a valve to change the mass flow rate so as to achieve a desired heat transfer fluid exit temperature. This control strategy requires that the flow controller (FC) knows the actual flow rate of the heat transfer fluid, which is measured by a flow rate sensor (FT). This control strategy can be designed and tuned so that each receiver may operate at its own design conditions. Notably, the design conditions do not have to be the same for each system and/or solar receiver. For example, each solar receiver may have different geometries, heat transfer fluids, energy input, mass flow rate, exit temperature, etc.

The invention claimed is:

1. A concentrated solar power system comprising:
    a solar tower;
    multiple solar receivers mounted to the solar tower at different vertical elevations;
    a plurality of heliostats provided on the ground within a heliostat field, each heliostat being configured to concentrate solar radiation on any of the solar receivers mounted to the solar tower;
    a first heat transfer fluid configured to be heated by at least a first solar receiver;
    a working fluid configured to drive a first thermodynamic cycle, wherein the working fluid does not flow through the solar receivers; and
    a heat exchanger configured to transfer heat from the first heat transfer fluid to the working fluid.

2. The system of claim 1, wherein there are three solar receivers mounted to the solar tower at different vertical elevations.

3. The system of claim 1, wherein each solar receiver is configured to operate at a different temperature.

4. The system of claim 1, wherein the solar receivers are cascaded with each other.

5. The system of claim 4, wherein the solar receivers share the first heat transfer fluid.

6. The system of claim 1, further comprising a second heat transfer fluid configured to be heated by at least a second solar receiver, wherein the first and second solar receivers do not share the same heat transfer fluid.

7. The system of claim 6, wherein the first and second solar receivers use different types of heat transfer fluid.

8. The system of claim 7, wherein one of the first or second solar receiver uses a liquid heat transfer fluid and the other of the first or second solar receiver uses a gas heat transfer fluid.

9. The system of claim 1, further comprising a second heat exchanger configured to receive the second heat transfer fluid that has been heated by the second solar receiver, wherein the working fluid flows through both heat exchangers.

10. The system of claim 1, wherein the heat exchanger is configured to receive the first heat transfer fluid that has been heated by the first solar receiver and a second solar receiver.

11. The system of claim 1, wherein the heat exchanger is configured to receive the heat transfer fluid that has been heated by the first solar receiver and wherein the working fluid is a gas used to drive a turbine.

12. The system of claim 1, further comprising a first control system configured to control a first portion of the system that includes the first solar receiver and a second control system configured to control a second portion of the system that includes a second solar receiver.

13. The system of claim 12, wherein each control system comprises a temperature sensor that monitors a temperature of a heat transfer fluid that exits the associated solar receiver and a mass flow controller configured to control a flow rate of the heat transfer fluid to obtain a desired heat transfer fluid exit temperature.

14. The system of claim 1, further comprising a thermal energy storage system configured to store the heat transfer fluid that exits at least the first solar receiver.

15. The system of claim 14, further comprising a first heliostat is positioned closer to the solar tower than a second heliostat, the first heliostat configured to heat the first solar receiver positioned lower than a second solar receiver, and the second heliostat configured to heat the second solar receiver.

16. A method for generating power, the method comprising:
    providing a solar tower to which first and second solar receivers are mounted at different vertical elevations;
    concentrating solar radiation on the first and second solar receivers using a field of heliostats;
    heating a first heat transfer fluid within the first solar receiver and heating a second heat transfer fluid within the second solar receiver, the first and second heat transfer fluids being different fluids;
    delivering the first heat transfer fluid to a heat exchanger through which a working fluid flows to transfer heat from the first heat transfer fluid to the working fluid; and delivering the working fluid to a thermodynamic power system to generate power.

17. The method of claim 16, further comprising delivering the second heat transfer fluid to a further heat exchanger through which a working fluid also flows to transfer heat from the second heat transfer fluid to the working fluid.

18. The method of claim 16, further comprising delivering the second heat transfer fluid to the heat exchanger to transfer heat from the second heat transfer fluid to the working fluid.

19. The system of claim 1, further comprising a second heat transfer fluid configured to be heated by at least a second solar receiver, the second heat transfer fluid being configured to independently drive a second thermodynamic cycle that is different from the first thermodynamic cycle.

20. A concentrated solar power system comprising:
a solar tower having a first solar receiver positioned below a second solar receiver;
a heliostat field provided on the ground, the heliostat field including a plurality of near-field heliostats and a plurality of far-field heliostats, each of the plurality of near-field heliostats and the plurality of far-field heliostats configured selectively and independently concentrate solar radiation on one of the first solar receiver and the second solar receiver depending on an intensity of solar radiation; and
a control system configured to control the flow of a heat transfer fluid through one or both of the first and second solar receivers based on a temperature of the heat transfer fluid exiting a respective one or both of the first and second solar receivers to achieve a desired exit temperature to drive a thermodynamic cycle.

21. The system of claim 20, wherein the heat transfer fluid includes a first heat transfer fluid configured to be heated by the first solar receiver to drive a first thermodynamic cycle and a second heat transfer fluid configured to be heated by the second solar receiver to drive a second thermodynamic cycle independently of the first thermodynamic cycle.

22. A concentrated solar power system comprising:
a solar tower having a first solar receiver positioned below a second solar receiver;
a heliostat field provided on the ground, the heliostat field including a plurality of near-field heliostats and a plurality of far-field heliostats, each of the plurality of near-field heliostats and the plurality of far-field heliostats configured selectively and independently concentrate solar radiation one of the first solar receiver and the second solar receiver depending on an intensity of solar radiation;
a first heat transfer fluid configured to be heated by the first solar receiver to drive a first thermodynamic cycle; and
a second heat transfer fluid configured to be heated by the second solar receiver to drive a second thermodynamic cycle independently of the first thermodynamic cycle.

\* \* \* \* \*